United States Patent
Cepulis

(10) Patent No.: US 9,052,916 B2
(45) Date of Patent: Jun. 9, 2015

(54) SYSTEM ROM WITH AN EMBEDDED DISK IMAGE

(75) Inventor: Darren Cepulis, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2552 days.

(21) Appl. No.: 11/524,680

(22) Filed: Sep. 21, 2006

(65) Prior Publication Data

US 2008/0077711 A1    Mar. 27, 2008

(51) Int. Cl.
| | |
|---|---|
| G06F 15/167 | (2006.01) |
| G06F 15/16 | (2006.01) |
| G06F 3/06 | (2006.01) |
| G06F 13/00 | (2006.01) |
| G06F 13/24 | (2006.01) |
| G06F 13/20 | (2006.01) |
| G06F 9/44 | (2006.01) |
| G06F 9/445 | (2006.01) |

(52) U.S. Cl.
CPC ............ *G06F 9/4406* (2013.01); *G06F 3/0604* (2013.01); *G06F 8/65* (2013.01)

(58) Field of Classification Search
USPC .............. 709/212, 217, 250; 711/4, 102, 113; 710/33, 48, 20, 108, 260, 313
See application file for complete search history.

(56) References Cited

U.S. PATENT DOCUMENTS

| | | | |
|---|---|---|---|
| 5,978,903 A * | 11/1999 | Quimby et al. ............... | 712/229 |
| 6,226,747 B1 * | 5/2001 | Larsson et al. .................. | 726/31 |
| 2003/0037244 A1 * | 2/2003 | Goodman et al. ............ | 713/189 |
| 2003/0065875 A1 | 4/2003 | Van Cleve et al. | |
| 2003/0065913 A1 | 4/2003 | Cepulis et al. | |
| 2003/0074550 A1 * | 4/2003 | Wilks et al. ....................... | 713/2 |
| 2003/0115443 A1 | 6/2003 | Cepulis et al. | |
| 2006/0031682 A1 * | 2/2006 | Sakai et al. ................... | 713/182 |
| 2007/0005867 A1 * | 1/2007 | Diamant ....................... | 710/306 |
| 2007/0150715 A1 * | 6/2007 | Rothman et al. .................. | 713/1 |
| 2008/0104348 A1 * | 5/2008 | Kabzinski et al. ............ | 711/164 |

* cited by examiner

*Primary Examiner* — Ninos Donabed
*Assistant Examiner* — Farrukh Hussain
(74) *Attorney, Agent, or Firm* — Law Office of Philip Scott Lyren

(57) ABSTRACT

Embodiments include methods, apparatus, and systems using a system read only memory (ROM) with an embedded disk image. One method of software execution includes embedding a disk image in a system read only memory (ROM) of a computer system; exporting the disk image through a universal serial bus (USB) interface after an operating system (OS) of the computer system loads; and executing software in the disk image in the computer system.

11 Claims, 4 Drawing Sheets

SYSTEM ROM WITH AN EMBEDDED DISK IMAGE

BACKGROUND

Installation of an operation system is one of the first functions performed in a computer system or server before it is ready for operation. Once installed, the operation system (OS) uses drivers to communicate with hardware in computer system. Software manufacturers often bundle the operating system drivers and other programs in each initial package. For various reasons, current or updated drivers are often not included with the initial package and hence updated drivers are required to be subsequently installed or patched to the operating system.

The system ROM provides an embedded virtual disk for use in pre-boot or pre-install environments using an interrupt (INT) 13h basic input/output system (BIOS) interface. Generally, the INT 13h provides an interface between the BIOS and the operating system and supports various commands exchanged from the BIOS to the hard disk. Traditionally, the INT 13h BIOS is a 16-bit real mode interface suitable for obsolete OS's such as DOS. At the same time, modern operating systems use 32-bit or 64-bit communication protocol. Once the operating system boots, the INT 13h is no longer available for use since the communication protocols are different. As such, useful data, files, and programs embedded in the system ROM are not accessible. In order to have run-time access to such information, a specific or proprietary driver must be developed and maintained for each operating system.

DETAILED DESCRIPTION

Embodiments in accordance with the present invention are directed to apparatus, systems, and methods for utilizing embedded disk images in system ROM. In one exemplary embodiment, one or more disk images are embedded in the system ROM of a computer system. An embedded controller exports one or more of these disk images through a virtual universal serial bus (USB) interface. Thus, the images are available both before and after an operations system loads and runs. Additional proprietary drivers are not required for the operating system to access the drives and other information stored on the system ROM. Further, in one exemplary embodiment, a runtime system management interrupt (SMI) handler of the system ROM updates exported images and has the updates immediately visible to the operating system.

Exemplary embodiments in accordance with the present invention enable communication between the system ROM and the run-time operating system. Data, programs, and files stored in the system ROM are available to operating systems using 32-bit and 64-bit communication protocols. Such information includes, but is not limited to, updated OS drivers, event logs, and other value added executables. Since this information is embedded in the system ROM, the information is readily accessible after load and/or out-of-the-box and hence is accessible for a user to execute, install, and use.

Figure 1:
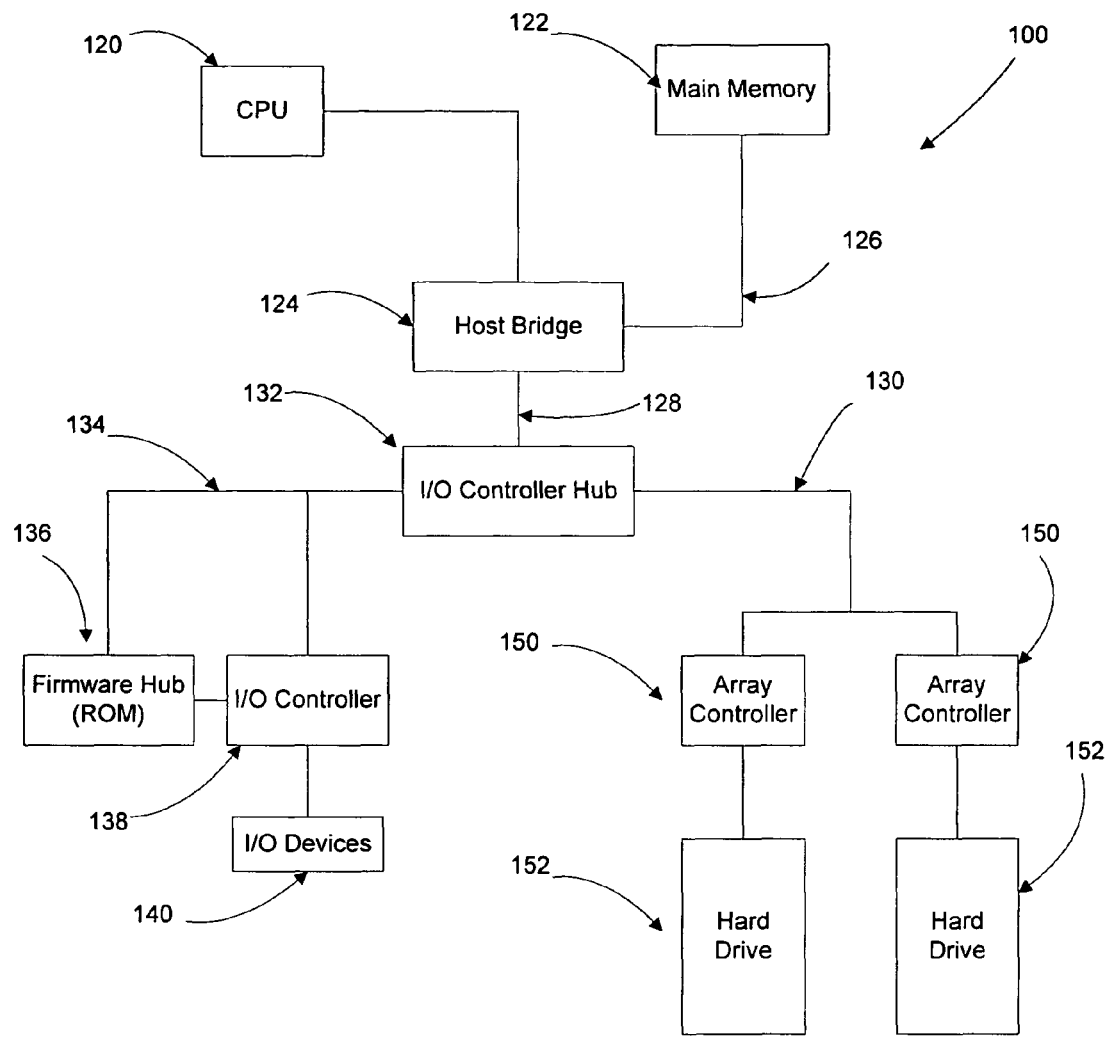
FIG. 1 is an exemplary computer system in accordance with an exemplary embodiment of the present invention.

Referring now to FIG. 1, a computer system 100 in accordance with an exemplary embodiment includes one or more processors or central processing units, shown as CPU 120. In one exemplary embodiment, the computer system 100 is a server system having the CPU coupled to a main memory 122 and a variety of other peripheral computer system components through an integrated host bridge logic device 124.

The main memory 122 couples to the host bridge logic 124 through a memory bus 126, and the host bridge logic 124 includes a memory control unit (not shown) that controls transactions to the main memory 122 by asserting the necessary control signals during memory accesses. The main memory 122 includes a conventional memory device or array of memory devices in which program instructions and data are stored.

The computer system 100 includes a second bridge logic device 132 that bridges a primary expansion bus 128 to various secondary buses, including a low pin count (LPC) bus 134 and a peripheral component interconnect (PCI) bus 130. In accordance with one exemplary embodiment, the bridge device 132 is an Input/Output Controller Hub (ICH). Although the ICH 132 of FIG. 1 is shown to support the LPC bus 134 and the PCI bus 130, various other secondary buses are supportable by the ICH 132. The computer system 100 is not limited to any particular type of primary expansion bus.

Referring still to FIG. 1, a firmware hub 136 couples to the ICH 132 by way of the LPC bus 134. The firmware hub 136 preferably comprises Read Only Memory (ROM) that contains software programs executable by the CPU 120. The software programs include, by way of example, programs to implement basic input/output system (BIOS) commands, and instructions executed during and just after Power On Self Test (POST) procedures.

An input/output (I/O) controller 138 couples to the ICH 132 and controls system functions including interfacing with various I/O devices, such as a keyboard, mouse or pointing device, drives, and various ports.

The computer system 100 of FIG. 1 also includes one or more array controllers 150 coupled to the ICH 132 through the PCI bus 130. Each array controller 150 couples to a plurality of hard drives 152. The array controller 150 performs data reads, data writes, and other necessary data manipulation to implement a redundant array of independent devices (RAID) system. While FIG. 1 shows two array controllers 150, computer system 100 supports any number of controllers, and exemplary embodiments are not limited to computer systems having a single CPU or implementing RAID systems.

One exemplary embodiment in accordance with the invention includes how to provide operating system drivers during and/or after the operating system installation process. In particular, the preferred embodiments of the present invention provide necessary operating system drivers by placing or storing those drivers in the ROM or firmware hub 136. In one exemplary embodiment, required or needed operating system drivers are copied from versions resident in the system ROM 136 during and/or after the operating system installation procedure.

Figure 2:
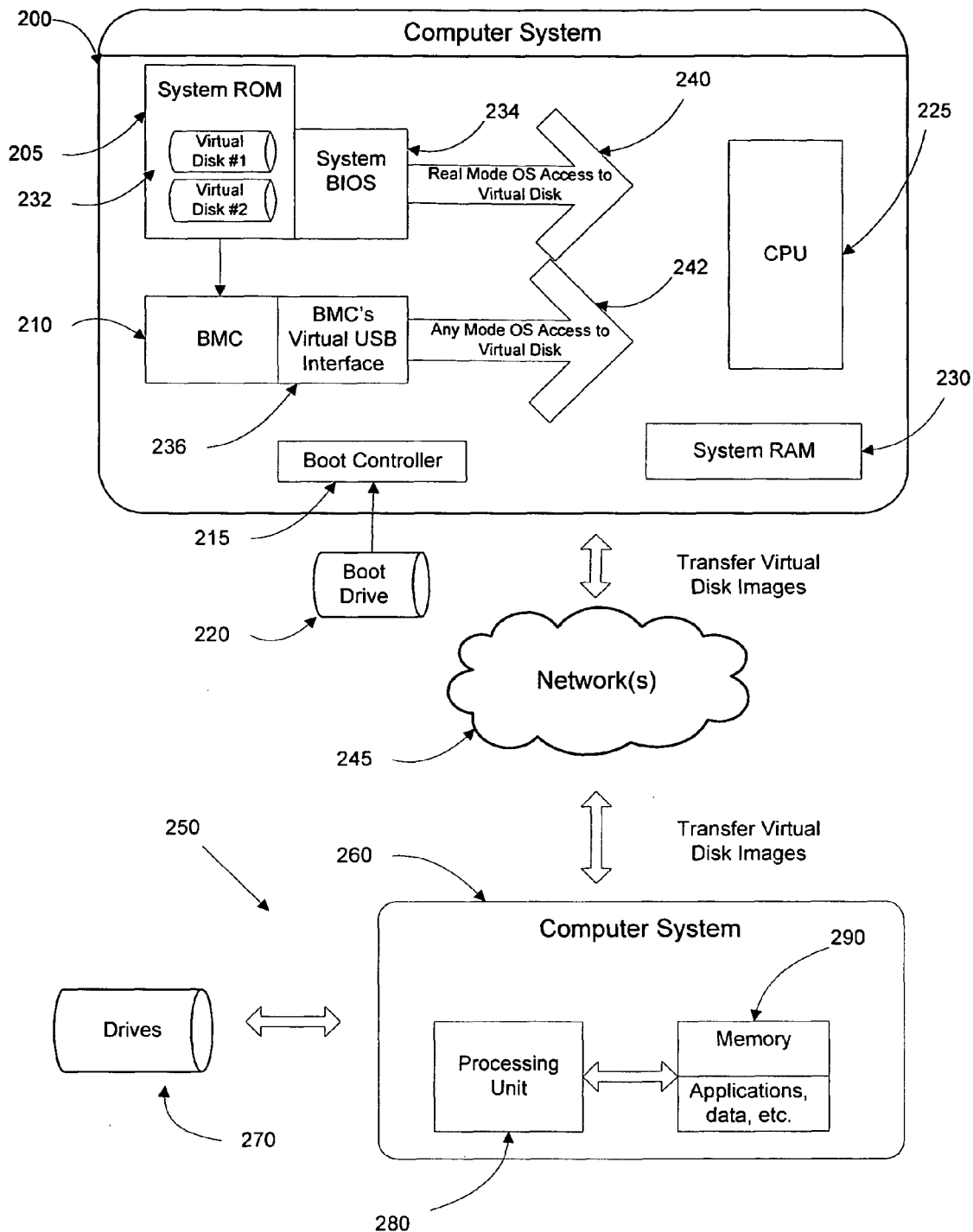
FIG. 2 is a block diagram of a computer system for transferring virtual disk images in accordance with an exemplary embodiment of the present invention.

FIG. 2 is a block diagram of a computer system for transferring virtual disk images between two or more computers in accordance with an exemplary embodiment of the present invention. A first computer system 200 (such as computer system 100 discussed in connection with FIG. 1) is coupled to a second computer system 250 through one or more networks 245.

The first computer system 200 includes a system ROM 205, a controller 210, a boot controller 215 coupled to a boot drive 220, a CPU 225, and system random access memory (RAM) 230. In one exemplary embodiment, the system ROM 205 includes initialization and 16-bit run-time code and plural virtual disks 232 (shown as virtual disk #1 and virtual disk #2). The system ROM also includes a system BIOS 234. In one exemplary embodiment, the system BIOS 234 includes a 16-bit INT 13h disk access code, and the controller 210 is a baseboard management controller (BMC) that includes a BMC programmable USB interface 236.

As used herein, the term "BIOS" refers to a program or software code executed by a computer or electronic device when it is first powered on. The BIOS prepares the computer or electronic device so other software programs stored on different media (such as, but not limited to, floppies, compact disks (CDs), flash drives, hard drives, etc.) can load, execute, and gain control of the computer or electronic device during booting up (i.e., a process that starts an operating system when a computer or electronic device is turned on). In one exemplary embodiment, the BIOS program is embedded on a chip that controls various devices in a computer or computer system. For example, the BIOS, which executes when a computer is initially powered on, initializes the hardware interfaces, performs diagnostics (such as tests on hard drive, memory, other hardware, etc.), and decompresses from the BIOS memory space to the system main memory where it executes. In one exemplary embodiment, the BIOS is stored on erasable programmable read-only memory (EEPROM), flash memory, or other memory that is changeable or upgradeable.

As shown in FIG. 2, the boot drive 220 is coupled to the boot controller 215 and contains the operating system. The boot drive includes, but is not limited to, hard drives, floppy disks, CDs, flash drives, boot chips, etc.

In one exemplary embodiment, the BIOS provides support for a software interrupt (example, INT 13h) when the OS or applications requests access, for example, to the hard disk, floppy disk, or embedded virtual disk. The INT 13h supports various commands such as, but not limited to, reading, writing, formatting, etc. As shown with arrow 240, the system BIOS 234 provides 16-bit real mode OS access to data on virtual disks 232.

The BMC 210 is a controller or microcontroller (example, computer-on-a-chip that controls electronic devices) embedded on a printed circuit board (such as a motherboard) of a computer (such as a server). The BMC includes a programmable USB interface 236. As shown with arrow 242, the BMC's USB interface 236 provides a standard interface for any modern OS to access the embedded virtual disks 232 located in the system ROM 205.

The computer system 250 includes a computer 260 (such as a host or client computer) and one or more drives 270. The computer 260 comprises a processing unit 280 (such as one or more processors of central processing units, CPUs) for controlling the overall operation of memory 290 (such as random access memory (RAM) for temporary data storage and read only memory (ROM) for permanent data storage). The memory 290, for example, stores applications, data, control programs, algorithms (including diagrams and methods discussed herein), and other data associated with the computer system 250. The processing unit 280 communicates with memory 290 and drives 270 and many other components via buses, networks, etc.

Embodiments in accordance with the present invention are not limited to any particular type or number of computers and computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

The network 245 connects computer system 200 with computer system 260 and includes any one or more of various medium, device, or mechanism that allows nodes or computers to communicate. Multiple different networks can connect the computer systems, where each network has different characteristics. For example, one network uses wires, another uses radio transmissions, etc. Further, portions of the networks can have different bandwidths, latencies, packet sizes, access mechanisms, reliability protocols, and ordering guarantees, to name a few examples, and include, but are not limited to, the intranet, extranets, intranets, local area networks (LANs), wide area networks (WANs), telephony networks, and other digital networks, to name a few examples. In one exemplary embodiment, the network 245 provides a communication path for virtual disk images to be transferred from computer system 250 to computer system 200.

Figure 3:
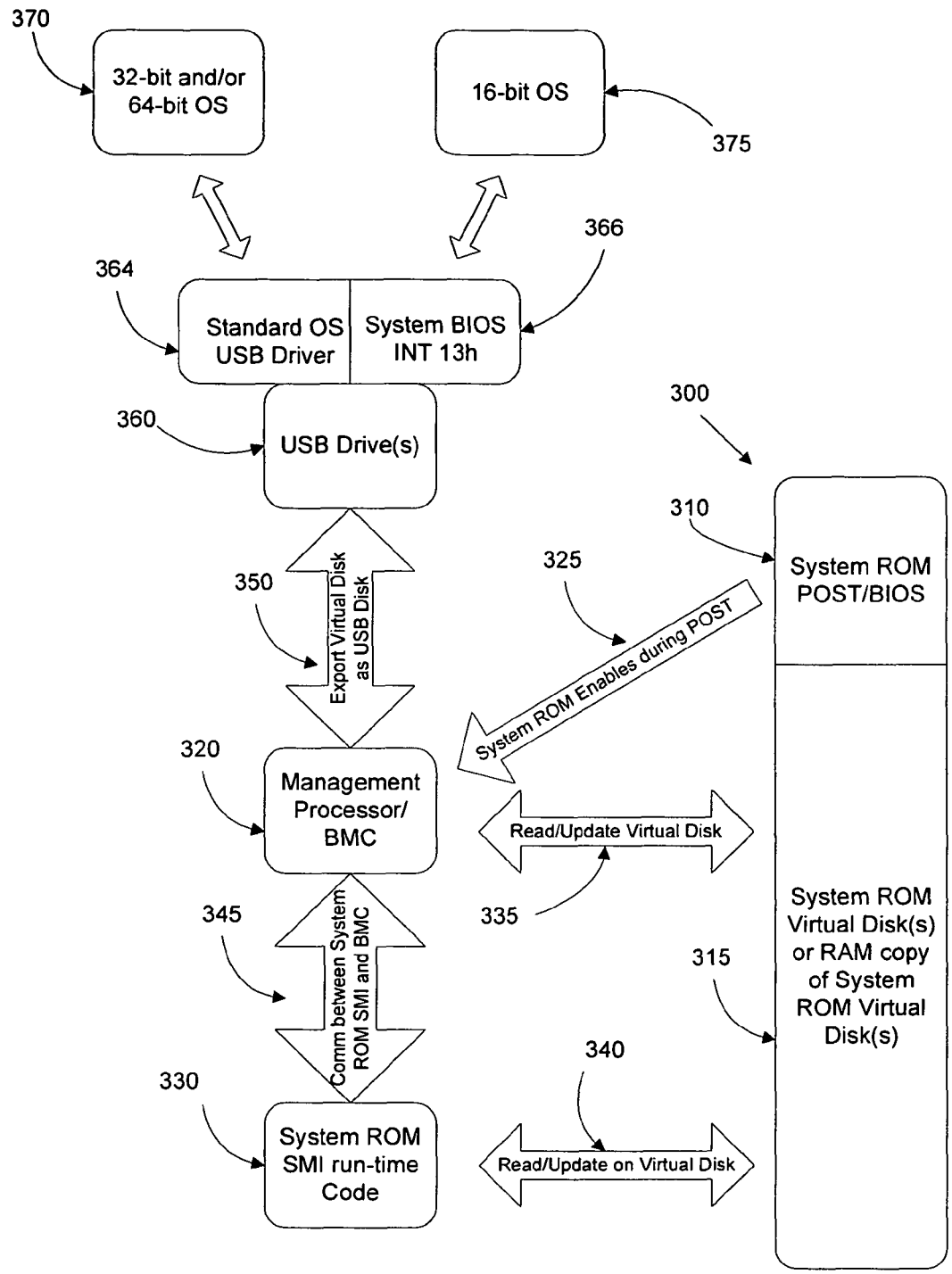
FIG. 3 is a block diagram for distributing operating system driver updates through a system ROM in accordance with an exemplary embodiment of the present invention.

FIG. 3 is a block diagram for distributing operating system driver updates through a system ROM in accordance with an exemplary embodiment of the present invention. As shown, the system ROM 300 includes two portions: a BIOS portion 310 and a virtual disk portion 315. The BIOS portion 310 includes system ROM power-on self test (POST) and BIOS. The POST includes a diagnostic testing sequence executed by the computer during power-on. If the diagnostic passes, then the computer continues with the boot. The BIOS includes code that comes with or originally shipped with a computer or electronic device and includes, for example, code necessary to operate a keyboard, mouse or pointing device, display, disk drives, serial communications and other functions and devices. The virtual disk portion 315 includes one or more system ROM virtual disks or RAM copies of system ROM virtual disk(s).

The BIOS portion 310, executing on the host CPU, communicates with the baseboard management controller (BMC) 320 along arrow 325 during POST via a set of predetermined commands. In one exemplary embodiment, one of these commands loads an entire embedded disk image into the BMC for use as a USB disk device. Another command only passes the memory location of the embedded disk image to the BMC, whereupon it will present the embedded disk as a USB device and access the embedded disk image as needed via arrow 335. Arrow 335 indicates accesses to the virtual disk by the BMC, which has the ability to read or write the memory space where the embedded disk images are located.

The virtual disk portion of the system ROM 315 is accessible by both the BMC 320 and the system ROM's SMI code 330. The SMI code is executed when the CPU receives an SMI (System Management Interrupt). SMI can be signaled by the BMC or independently of the BMC due to system hardware events. SMI Code, executing on the host CPU, communicates to the BMC via a set of predetermined commands and can also access the embedded virtual disk images supplied in the system ROM via arrow 340.

The system ROM SMI run-time code 330 and BMC 320 communicate with each other as shown along arrow 345. The system ROM SMI code can send commands to the BMC 320 and instruct the BMC to mount one or more embedded virtual disks as a USB drive. One of the commands sent to the BMC by the SMI code loads an entire embedded disk image into the BMC for use as a USB disk device. Another command only passes the memory location of the embedded disk image to the BMC, where upon it will present the embedded disk as a USB device and access the embedded disk image directly as needed via arrow 335. Further, the BMC can signal the SMI in order to request an embedded virtual disk image or address in system RAM/ROM of an embedded virtual disk image so that it can mount it as a USB disk. This virtual disk image or its address is then supplied to the BMC by the system ROM SMI code. The BMC can also signal the SMI in order to update an embedded disk image located in the system ROM. In this case, the SMI code reads or receives an updated disk image from the BMC and updates the embedded disk image in the system ROM via normal ROM flash methods.

As shown, the BMC 320 couples along arrow 350 to provide the standard interface to the USB drive(s) 360. The USB drive(s) are accessible by a standard OS USB driver 364 and by system BIOS INT 13h 366. In turn, the standard OS USB driver 364 couples to the 32-bit and/or 64-bit OS (such as a Windows or Linux based OS). The system BIOS INT 13h 366 couples to a 16-bit OS 375.

In one exemplary embodiment, the OS switches to a 32-bit or 64 bit mode after booting. These modes are generally not compatible with the 16-bit mode employed by the BIOS INT 13h. In spite of this incompatibility, exemplary embodiments in accordance with the present invention enable one or more disk images embedded in the system ROM to be transferred or exported via a virtual USB interface. The BMC 320 exports one or more of the disk images from the virtual disk portion 315 through the USB drive(s) interface 360. As such, the images are available both before and after boot operations of the OS (for example, the images are available after instructions executed during Power On Self Test (POST) procedures). Additional proprietary drivers are not required for the operating system to access the virtual disks once they are mounted as USB drives. Thus, exemplary embodiments in accordance with the present invention enable communication between the system ROM and a run-time operating system. Data, programs, and files stored in the system ROM are available to modern 32-bit and 64-bit operating systems using standard USB communication protocol. Such information includes, but is not limited to, updated OS drivers, event logs, and other value added executables. Since this information is embedded in the system ROM, the information is readily accessible after load and/or out-of-the-box and hence is accessible for a user to execute, install, and use, even from a remote location through one or more networks (example, from computer system 250 of FIG. 2).

In one exemplary embodiment, the system ROM 300 has one or more embedded virtual disk images 315. The BMC 320 includes bus-master capability and the ability to present a disk image through a virtual standard USB interface, such as USB drive(s) 360. During POST, the BMC 320 is configured to use one or more of the system ROM embedded images as virtual USB drives. Initially, the system ROM decompresses the necessary or selected images (if such decompression is needed or requested). Next, the system ROM 300 notifies the BMC 320 of the location of one or more embedded images to be used, such as images in virtual disk portion 315. The BMC mounts the embedded virtual disk images as USB drive(s) 360, either transferring images from the system ROM into its own memory or using the images in place in the system ROM or system memory.

Exemplary embodiments in accordance with the present invention utilize the inherent hot-plug capability of the USB during run-time. The SMI handler code of the system ROM can add or remove virtual disk images from the view of the OS by passing commands to the BMC. The changes are immediately (example, in real-time) visible under the OS. This immediate availability is useful, for example, for updating, passing in, or getting an event log or error log. Further, the availability allows the system ROM to directly launch execution of an OS program such as a software or driver installation utility using AUTORUN capability.

Figure 4:
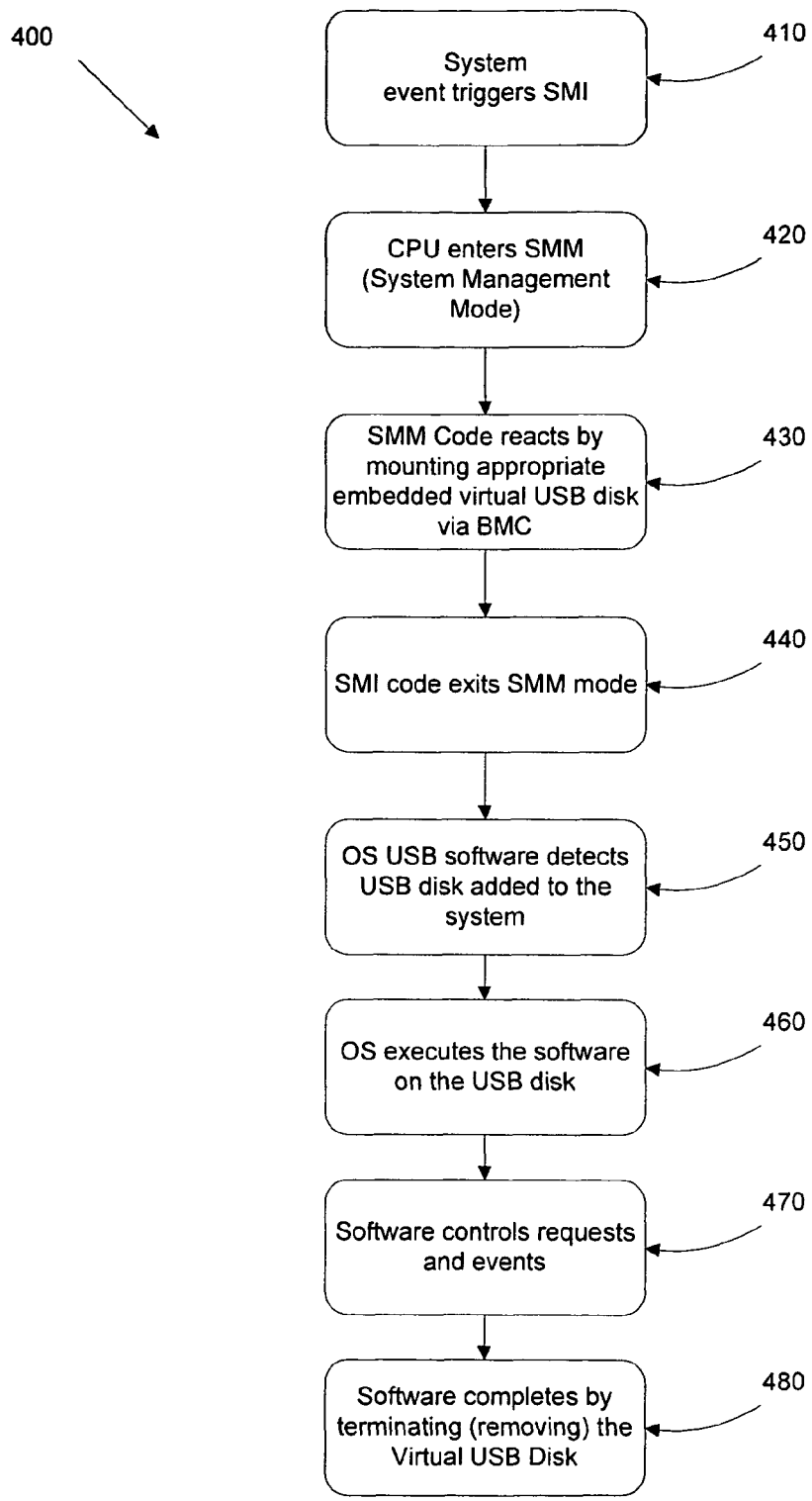
FIG. 4 is an exemplary flow diagram in accordance with an exemplary embodiment of the present invention.

FIG. 4 is an exemplary flow diagram 400 illustrating a system ROM embedded virtual disk using a USB interface in accordance with an exemplary embodiment of the present invention.

According to block 410, a system event triggers the system management interrupt (SMI). By way of example, such system events include, but are not limited to, a hardware error, an OS or driver driven event (such as a request for a driver update or patch using, for example, advanced configuration power interface (ACPI) to abstract the needed hardware SMI signaling), and a user driven request to run a system specific utility. For instance, after an SMI is issued to a CPU, the operating mode of the CPU changes from a first mode (such as a real mode, protect mode, or virtual mode) to the system management mode (SMM). The SMI is a non-maskable interrupt with priority over mask enabled interrupts and ordinary non-maskable interrupts.

Upon receiving the SMI, the CPU activates one or more SMI routines that are provided by the system ROM. According to block 420, the CPU enters SMM. In one embodiment, SMM code is platform specific and resides in the system ROM.

According to block 430, the SMM code reacts by mounting the appropriate or designated embedded virtual USB disk(s) via a controller, such as a baseboard management controller (BMC). In one exemplary embodiment, the SMM code sends a command to the BMC and instructs the BMC to mount an embedded disk image as a USB drive. The BMC is a controller or microcontroller (example, computer-on-a-chip that controls electronic devices) embedded on a printed circuit board (such as a motherboard) of a computer (such as a server). The BMC manages the interface between the platform hardware and the system management software. In one exemplary embodiment, a user or system administrator remotely communicates with the BMC using, for example, a BMC management utility that uses Intelligent Platform Management Interface (IPMI) protocols.

According to block 440, the SMI code exits the SMM mode. Here, control is transferred from the system ROM back to the operating system.

According to block 450, the OS USB software detects the USB disk added to the system. In one exemplary embodiment, all current 32-bit and 64-bit operating systems control the addition and removal of USB devices.

According to block 460, the operating system executes the software on the USB disk. For instance, the operating system automatically runs the software on the disk if the OS supports an AUTORUN capability for newly added USB drives. If such auto-run is not supported, then execution is manually or user initiated.

According to block 470, the software controls and manages requests and events. Such requests and events include, but are not limited to, installation of a driver, installation or update of a software utility, update of a currently installed driver to a newer or revised version, the logging of a hardware error, etc.

According to block 480, the software completes by terminating or removing the virtual USB disk. After this termination, the software turns off the disk through a command sent to the BMC.

As used herein, a "driver" (also known as "device driver" or "software driver") is program or computer software that controls or interfaces with an electronic device. In one exemplary embodiment, the driver functions as an intermediary between the program (which uses a first set of commands) and the electronic device (which uses a second set of commands). For instance, the driver receives one or more of the first set of commands and translates them into respective one or more of the second set of commands. The driver thus provides commands to and/or receives data from the device and provides an interface to the OS and software applications.

In one exemplary embodiment, the embedded images are available anytime (example, pre-OS install, pre-boot, and run-time under various operating systems, such as 32-bit, 64-bit, etc.). The images are available to the OS without the need for additional proprietary driver development, maintenance, and installation for each current OS. Further, since various information, data, programs, etc. are storable on the virtual disks, software developers can rollout or continuously provide updated OS executables. Further, by using the SMI to mount or unmount virtual USB disks, the system ROM has the ability to launch OS applications, installers, etc. By way of example, the system ROM is thus able to automatically install a platform specific system health driver or power regulator application after the OS is loaded and/or up and running without the need for user intervention. Further, since exemplary embodiments can be implemented in firmware (in the system ROM and BMC), the implementation and manufacturing costs are relatively low. Further yet, exemplary embodiments are readily expandable through compression or larger ROM parts and further allow for a great number of virtual embedded disks to be mounted at the same time.

Embodiments in accordance with the present invention are utilized in a variety of systems, methods, and apparatus. For instance, one or more computers or computer systems execute the flow diagram and/or aspects of exemplary embodiments in accordance with the present invention.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of software execution, comprising:
    embedding a disk image in a system read only memory (ROM) of a computer system;
    exporting the disk image through a virtual universal serial bus (USB) interface after an operating system (OS) of the computer system loads;
    executing software in the disk image in the computer system;
    updating the disk image using a system management interrupt (SMI) handler provided by the system ROM;
    enabling access of the updated disk image to the OS; and
    providing an update to a driver of the OS through the disk image.

2. The method of claim 1 further comprising, storing the update to the driver in the disk image.

3. The method of claim 1 further comprising: sending a command to a baseboard management controller (BMC) to mount the disk image as a USB drive.

4. The method of claim 1 further comprising:
    triggering a system management interrupt (SMI) to activate an SMI routine provided by the system ROM;
    mounting an embedded virtual universal serial bus (USB) disk in response to the SMI;
    executing software on the USB disk to provide the update to the driver.

5. The method of claim 1 further comprising, enabling communication between the system ROM and the OS during run-time of the OS.

6. The method of claim 1 further comprising, transferring the disk image from a remote computer to the system ROM of the computer system.

7. The method of claim 1 further comprising, reading and updating the disk image with a controller embedded in the computer system.

8. A computer system, comprising:
    a universal serial bus (USB) drive;
    a read only memory (ROM) for storing a disk image;

a processor for transferring the disk image through a virtual universal serial bus (USB) interface in the computer system after an operating system (OS) of the computer system boots;

a revised OS drive stored in the ROM; and a system memory, wherein the processor enables the USB drive to transfer the disk image from the ROM into the system memory, and the revised OS drive is available to the OS of the computer system after the OS boots.

9. The computer system of claim 8 further comprising, a basic input/output system (BIOS) program in the ROM, a system BIOS interrupt that utilizes a 16-bit operation mode, and an operating system that utilizes an operation mode greater than the 16-bit operation mode.

10. The computer system of claim 8, wherein the processor updates the disk image and makes the updated disk image available in real-time to the OS.

11. The computer system of claim 8 further comprising, receiving a trigger at the processor to initiate an interrupt, export the disk image from the ROM, and execute the disk image.

* * * * *